Patented Sept. 21, 1954

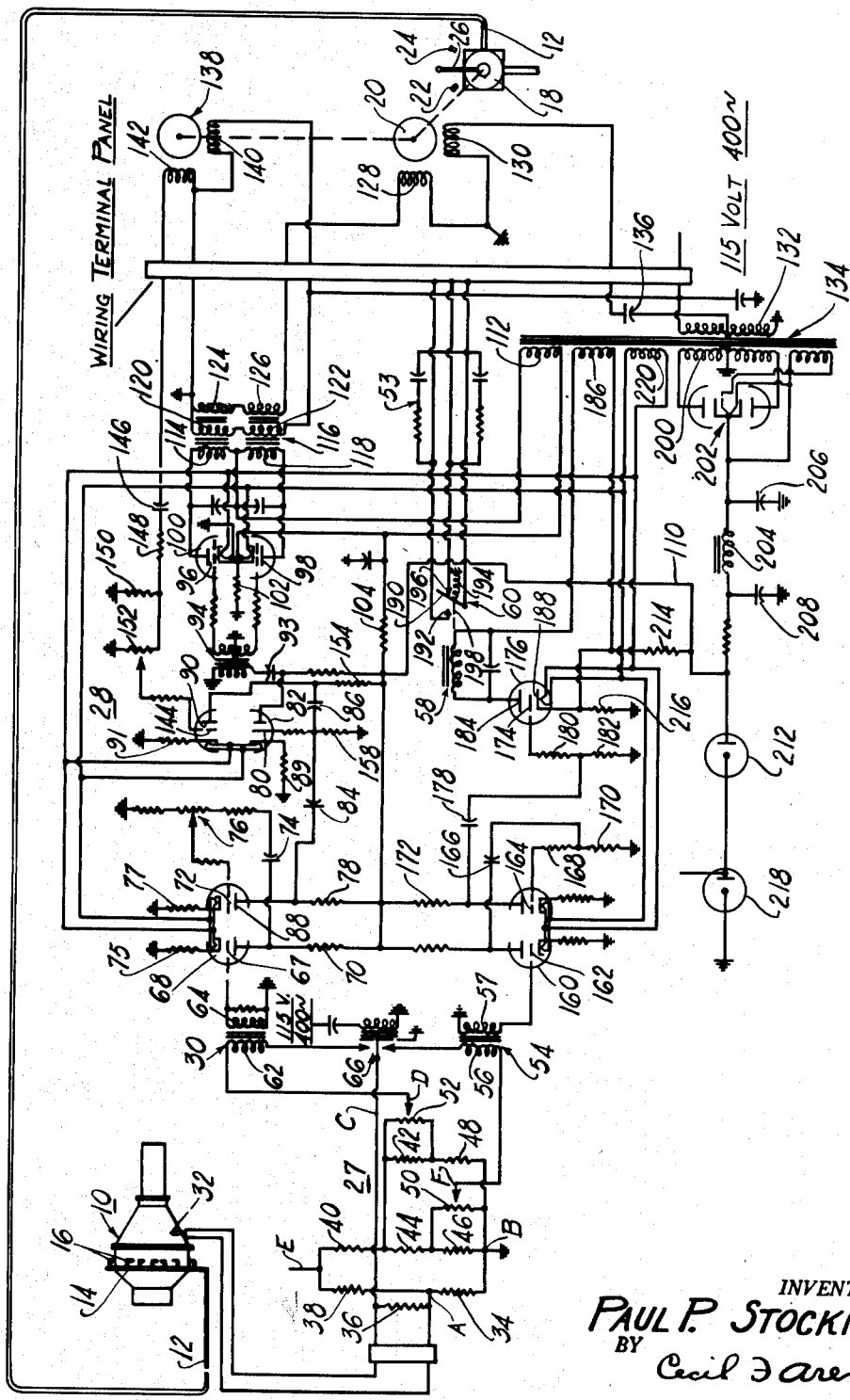

2,689,455

UNITED STATES PATENT OFFICE 2,689,455

ELECTRONIC CONTROL APPARATUS FOR GAS TURBINE ENGINES

Paul P. Stockinger, South Bend, Ind., assignor to Bendix Aviation Corporation, South Bend, Ind., a corporation of Delaware Application May 29, 1951, Serial No. 228,867

13 Claims. (Cl. 60—39.28)

The present invention relates to electronic control means and more particularly to the use of such apparatus in connection with gas turbine engines. It is especially useful where an engine operating condition is sensed with a view to controlling apparatus, such for example, as fuel and ignition systems, in accordance with said condition. It is to be understood, however, that this is only by way of example and that the invention may be used wherever found applicable.

It is one of the objects of the invention to provide input means alternately connectable first to one then the other of two networks connected respectively to different apparatus for controlling the same in accordance with a condition.

The above and other objects and features of the invention will be apparent from the following description of the apparatus taken in connection with the accompanying drawing which forms a part of this invention.

The single figure is a diagrammatic view of the electronic control means as applied to the ignition means and fuel means of a gas turbine.

Referring now to the drawing, the reference numeral 10 designates a gas turbine aircraft engine embodying my invention. A pipe line 12 supplies fuel to a main fuel manifold 14, equipped with a plurality of nozzles 16 communicating with combustion chambers or burners, not shown. A fuel valve 18 is located in the pipe line 12 between a source of fuel, not shown, and the manifold 14. The valve 18 is operatively connected to a two-phase motor 20, which is capable of moving the valve between mechanical stops 22 and 24. An arm 26 is carried by a movable part of the valve so as to engage the stops 22 and 24, thus limiting valve movement.

Means is provided for controlling the fuel valve 18 in accordance with a predetermined engine operating temperature and comprises a network which embodies a bridge 27 and an amplifier 28, the latter of which is electrically coupled to the bridge, by a transformer 30.

The bridge 27 includes a thermocouple 32 which supplies an input signal representing engine temperature to the bridge. This signal which is in the form of a direct voltage is proportional to the difference between the hot and cold junction temperature. The amplifier 28 however, is intended to operate as a function of the hot junction temperature only, and to accomplish this a temperature compensating resistor 34 is provided which varies its resistance with temperature so that the voltage from A to B is a function of the thermocouple cold junction temperature. That is, as the cold junction temperature increases, the voltage output of thermocouple will decrease for a constant hot junction temperature, but the voltage across the compensating resistor will increase enough to make the voltage from B to C independent of the cold junction temperature. Resistor 36 is connected across the thermocouple output to provide for "safe failure" should the tremocouple circuit external to the bridge become open. This resistor would complete the bridge circuit and the equivalent of an under-temperature engine condition exists. Resistors 38, 40, 42, 44, 46 and 48, and variable resistors 50 and 52, are arranged in the bridge with respect to the thermocouple output voltage, which appears across BC, and a regulated direct voltage, which appears across EB, to produce two output voltages, one of which is zero when engine operating temperature is at a predetermined low setting, and the other of which is zero when engine operating temperature is at a predetermined high setting.

It is a function of the low engine temperature setting in the bridge to cause an ignition circuit 53, only a portion of which is shown, to be energized when engine temperature falls below a predetermined value, in this case approximately 690 degrees Fahrenheit, thus maintaining combustion. This setting is accomplished by adjusting the variable resistor 50 until the voltage which appears across BF represents the desired low engine operating temperature. That is, there is a direct relationship between voltage selected and desired engine temperature. In the instant case, for example, the bridge is set so that the reference voltage BF represents an engine temperature of 690 degrees Fahrenheit modified by the drop across the resistor 34. This reference voltage BF is differentially connected with respect to the thermocouple output voltage BC. A transformer 54 is connected in the output of the bridge and is equipped with a primary 56 through which current flows when the voltage BC is greater or less than the voltage BF. The direction of current through the primary 56 which determines the polarity across secondary 57, depends upon the relative magnitudes of the voltages BC and BF. When voltage BC is equal to BF current in the primary 56 is zero, since the voltages cancel.

The transformer 54 is electrically coupled to an amplifier for controlling a relay 58, operatively connected to a switch 60, located in the ignition circuit.

It is a function of the high engine temperature setting in the bridge to cause the fuel valve 18 to close when engine temperature exceeds a predetermined value. This setting is made in the bridge by adjusting the variable resistor 52 until the reference voltage BD reflects a desired engine operating temperature. In the instant case, the bridge is set so that the desired high engine operating temperature will be substantially 1550 degrees Fahrenheit. The reference voltage BD reflects this temperature. Of course, this temperature setting will depend on the engine and can be changed at will. This reference voltage BD is differentially connected with respect to thermocouple voltage BC. The resultant voltage of the differentially connected voltages BD and BC is fed into primary 62 of the transformer 30. The direction of current through the primary 62, which determines the polarity across secondary 64, depends upon the relative magnitudes of the voltages BD and BC. Current will flow in the primary 62 only when the voltage BC is greater or less than BD. The resultant voltage between BC and BD appears across CD.

In order to utilize the bridge output, which comprises two resultant voltages representing low and high engine temperature operating conditions respectively, for controlling an ignition circuit and a fuel valve in that order, a novel switching and inverting mechanism 66 is provided. This mechanism is shown operated from a 115 volt 400 cycle supply so as to alternately connect the bridge output first to one transformer then to the other. When the bridge is connected to the transformer 54 the resultant voltage, of the differentially connected voltages BC and BF, appears across CF and is impressed on the primary 56. When the bridge is connected to the transformer 30 the resultant voltage, of the differentially connected voltages BC and BD, is applied to the primary 62. The network for controlling the fuel control apparatus or valve 18, includes the bridge 27 and the amplifier 28, the latter of which receives an alternating current input from the secondary 64. This alternating current is created by the pulsating direct current established in the primary winding by the switching action of the mechanism 66. For purpose of explanation only, assume the switching mechanism or chopper 66 is connected to transformers 30 and 54 to provide a signal voltage at the secondaries in phase with the 115 volt 400 cycle supply voltage for engine temperatures above the reference temperature and 180 degrees out of phase with the supply voltage for engine temperatures below the reference temperature. The magnitude of this secondary voltage is determined by the amount of unbalance between the reference temperature setting and actual engine temperature and its phase depends upon the relative magnitude of the unbalance, that is, whether voltage BD is greater or less than BC. The secondary voltage from transformer 30 is impressed on grid 67 of the left triode section of tube 68. The amplified voltage developed across resistor 70 is impressed on grid 72 of the right triode section of tube 68. This amplified voltage from the output of the left triode section is supplied to the grid 72, through a blocking condenser 74 and a potentiometer or attenuator 76, the latter of which controls the amount of signal to the grid.

Current flowing through resistors 75 and 77 produces a voltage bias for the tube 68. The output voltage from the right triode section of the tube 68 is developed across resistor 78 and fed into grid 80 of the lower triode section of tube 82, where the voltage is further amplified. Blocking condensers 84 and 86 keep the direct voltages impressed on plates 88 and 90 of the tubes 68 and 82 respectively from being applied to the grid 80 of the tube 82. Current flowing through resistors 89 and 91 produces a voltage bias for the tube 82. The output of the lower triode section is capacitively coupled by a condenser 93 to primary 92 of push-pull transformer 94 to provide voltages 180 degrees out of phase with each other to grids 96 and 98 of tube 100.

The tube 100 is biased to cut off by resistors 102 and 104 which are connected in series to a regulated direct voltage supply by a lead 110. With cutoff bias the signal output of the transformer 94 must reduce the negative voltage on one or the other of the grids 96 and 98 at the same instant the corresponding plate voltage is positive for conduction to occur in either tube section.

If engine temperature is equal to the reference temperature setting in the bridge there will be no signal, at which time neither section of the tube 100 will conduct.

If secondary 112 is connected to tube 100 to provide a positive plate voltage on the upper section of the tube during the period the grid voltage 96 is going positive (on a temperature in excess of the reference temperature setting) this section will conduct an average direct current through control winding 114 of magnetic amplifier 116, with a temperature below the reference temperature setting the lower section of the tube will conduct an average current through control winding 118.

The magnetic amplifier 116 is shown schematically by six windings on two cores. The operation of the magnetic amplifier may be explained on the basis of two similar transformers having primary windings 120 and 122, secondary windings 124 and 126, and the aforesaid control windings 114 and 118. The two secondary windings are connected series bucking to variable phase winding 128 of the two phase motor 20. The primary windings 120 and 122 are connected in series with 115 volt 400 cycle power supply. With no direct current through the control windings, the 115 volt supply is divided equally across the primary windings, the secondary voltages (which are equal and in opposite directions) will cancel each other and the variable phase winding 128 has no applied voltage. Assume that an average direct current is caused to flow through control winding 114 due to an engine temperature in excess of the reference temperature, this will tend to saturate the core which reduces the primary impedance of the transformer. Since the 115 volt primary supply is divided between the two primaries 120 and 122 in direct proportion to their primary impedances, the secondary voltage developed in winding 126 will exceed the voltage developed in winding 124, with the resulting voltage difference being applied to the variable phase winding 128 of the motor 20. An engine temperature below the reference temperature setting will in a similar manner, produce a control voltage which is 180 degrees out of phase with the voltage produced during an overtemperature condition of the engine. This 180 degree phase reversal of the applied voltage to the variable phase winding reverses the motor torque. Fixed phase winding 130 of the motor is connected to primary winding 132 of power transformer 134. A capacitor 136 is interposed in the connection between the primary 132 and the fixed phase winding 128 to cause a shift of approximately 90 degrees in the voltage applied to this winding with respect to the supply voltage. The direction of rotation and torque of the motor 20 are determined by the voltages applied to the two windings and the phase relationship between the applied voltages.

A rate generator 138 provides feedback for the amplifier 28, and is drivably connected to the motor 20 to produce a voltage proportional to its speed and a polarity determined by the direction of rotation. The generator is equipped with two windings 140 and 142 connected respectively to the 115 volt supply and to grid 144 of the upper triode section of the tube 82. The voltage output from the generator is phase corrected by capacitor 146, resistors 148, 150, and 152. The output voltage from the upper triode section of the tube 82 is combined via resistor 154 and capacitor 86 with the signal voltage from tube 68 which appears across resistor 158. This phase corrected feedback provides a voltage 180 degrees out of phase with the voltage appearing on the grid of the section of the tube 100 which is conducting. It is a function of this feedback voltage to reduce the grid excitation and hence the torque of motor 20. This results in a decrease in motor sensitivity and provides a more stable control.

The network for controlling energization of the ignition circuit includes, besides the bridge 27 and relay 58, an amplifier comprising a tube 160 having its left triode section connected to the secondary 57 by means of grid 162. The action of transformer 54 in producing a signal in secondary 57 is similar to the action of transformer 30 in producing a signal in secondary 64 as hereinbefore described. The amplified voltage developed in the left triode section of the tube 160 and across resistor 162 is impressed on grid 164 of the right triode section of this tube, by way of capacitor 166, and resistors 168 and 170. From the right triode section of the tube 160 the amplified output developed across resistor 172, which is in the form of an alternating voltage, is connected to grid 174 of tube 176. This alternating signal is applied to the grid through capacitor 178, and resistors 180 and 182. Plate 184 of the tube 176 is connected to one side of a secondary winding 186 of the power transformer 134, which in turn is connected to a 115 volt 400 cycle supply. The relay coil 58 is interposed in the connection between the plate 184 and the secondary 186. The other side of the secondary 186 is connected to cathode 188. The tube 176 is phase sensitive so that when the thermocouple output signal is above the low setting (due to engine temperature in excess of the reference setting) the phase of the signal appearing on the grid 174 is in phase with the voltage applied to the plate 184 and current is conducted through relay 58, thus moving member 190 of the switch 60 against contact 192, and interrupting the ignition circuit 53, only a portion of which is shown. A spring 194 holds member 190 against contact 196 to thereby close the ignition circuit when the relay 58 is deenergized. An armature 198 links the relay to the member 190. When the thermocouple output signal is below the low setting (due to engine temperature below the reference setting) the signal on the grid 174 is out of phase with the plate voltage and the tube is non-conducting, thus having no effect on the relay 58. Member 190 is now urged by the spring 194 against the contact 196.

The power supply for the networks include a high voltage mid-tapped secondary 200, inductively related to the primary 132 and connected in a full wave rectifier circuit 202 which changes the 400 cycle sine wave into a pulsating direct current. The pulsating direct current is smoothed by a low pass filter including reactor 204, capacitors 206 and 208. Tube 212 provides a regulated plate voltage for the tubes 68, 82, and 160, and a bias voltage to tube 100 through resistors 104 and 102, via lead line 110. The bias voltage from tube 212 to tube 176 is through resistors 214 and 216. Tube 218 provides a regulated voltage which is impressed across EB of the bridge circuit. Secondary winding 220 furnishes current to the filaments of all the tubes except the full wave rectifier tube, which receives its current from secondary winding 222.

Operation of the apparatus is as follows:

Assume a condition of engine operation wherein engine temperature rises beyond the high reference temperature setting in the bridge, that is, an over-temperature condition exists in the engine. As a result of this over-temperature condition a signal will appear across CD, having a magnitude proportional to the difference in temperature between the reference setting and actual engine temperature, and a polarity determined by the relative magnitudes. In the case of an over-temperature in the engine the signal in the secondary 64 will be in such a direction as to cause the two-phase motor to rotate the valve 18 toward closed position, thus reducing the fuel supply to the engine.

For an under-temperature condition in the engine, that is, engine temperature is below the high reference temperature setting, the signal in the secondary will be in the opposite direction, thus causing the motor 20 to rotate the fuel valve toward open position.

It will be observed that all during the engine over-temperature condition and during the under-temperature condition above the low reference setting the signal in the secondary winding 57, which is the voltage across CF in the bridge, is in phase with the plate voltage of tube 176, thus causing current flow through the relay 58. This actuates member 190, breaking the ignition circuit between member 190 and contact 196.

When engine temperature falls below the low reference temperature setting the signal in the secondary 57 reverses its direction, hence establishing an out of phase relationship between the voltages applied to the grid 174 and plate 184 of the tube 176, thus cutting off the flow of current in relay 58. This deenergizes the relay, allowing the spring 194 to close the ignition circuit, for sustaining combustion in the engine during this period.

Although the invention has been described in connection with certain specific embodiments, the principles are susceptible of numerous other applications that will readily occur to persons skilled in the art.

Having thus described the various features of the invention, what I claim as new and desire to secure by Letters Patent is:

1. The combination with a gas turbine engine having two sets of apparatus to be controlled by an operating condition of the engine, of a first network including a first amplifier and a bridge electrically coupled to said amplifier by a first transformer for controlling one of the sets of apparatus in accordance with said engine operating condition, a second network including a second amplifier and said bridge electrically coupled to said second amplifier by a second transformer for controlling the other set of apparatus, a device in the bridge and physically located in said engine to sense said operating condition and for producing a signal which represents said condition, and means for alternately connecting said first and second networks to the bridge output.

2. The combination with a gas turbine engine having a fuel control device and an ignition system, of means for controlling said device according to engine temperature, means for controlling said ignition system according to engine temperature, said first and second mentioned means including an electrical bridge network, a thermocouple in said network for supplying a voltage thereto representing engine temperature, and a mechanism for alternately connecting the bridge output to said first and second mentioned means.

3. The combination with a gas turbine engine having a fuel control device and an ignition system, of means for controlling said device according to engine temperature, means for controlling said ignition system according to engine temperature, said first and second mentioned means including an electrical bridge network, a thermocouple in said network for supplying a direct voltage thereto, and means for modulating said direct voltage and for alternately connecting the bridge output to said first and second mentioned means.

4. The combination with a gas turbine engine having a fuel control device and an ignition system, of means for controlling said device according to engine temperature, means for controlling said ignition system according to engine temperature, said first and second mentioned means including common engine temperature sensing apparatus, and a switching mechanism for alternately connecting said apparatus to said first and second mentioned means.

5. The combination with a gas turbine engine having a fuel control device and an ignition system, of means for controlling said device according to engine temperature, means for controlling said ignition system according to engine temperature, said first and second mentioned means including an electrical bridge network supplied with a common signal representing engine temperature, and a mechanism in the output of said bridge network for selectively connecting said first and second mentioned means to said network.

6. The combination with a jet engine having a fuel control device and an ignition system, of means for controlling said device according to engine temperature, means for controlling said ignition system according to engine temperature, said first and second mentioned means including an electrical bridge network supplied with a common direct voltage representing engine temperature, and an alternating current switching mechanism for alternately connecting the bridge output to said first and second mentioned means.

7. In combination, a first network for controlling apparatus in accordance with a temperature condition and including a first amplifier and a bridge coupled by a first transformer, a second network for controlling other apparatus in accordance with said condition and including a second amplifier and said bridge electrically coupled by a second transformer, a thermocouple in said bridge for establishing a first direct voltage which reflects said temperature condition, means in said bridge capable of producing a second direct voltage which reflects a first reference temperature setting, said first and second voltages being differentially connected in said bridge to produce a first resultant voltage which is fed into said first network, means in said bridge capable of producing a third direct voltage which reflects a second reference temperature setting, said first and third voltages being differentially connected in said bridge to produce a second resultant voltage which is fed into said second network, and a switching device for alternately connecting said first network to receive said first resultant voltage and said second network to receive said second resultant voltage.

8. In combination, a first network for controlling apparatus in accordance with a condition, a second network for controlling other apparatus in accordance with said condition, means in said first and second networks capable of establishing a signal representing said condition, and a device for selectively connecting said first and second networks to said means.

9. In combination, a first network for controlling apparatus in accordance with a temperature condition and including a first amplifier and a bridge electrically coupled to said amplifier by a first transformer, a second network for controlling other apparatus in accordance with said condition and including a second amplifier and said bridge electrically coupled to said second amplifier by a second transformer, a thermocouple in said bridge for establishing a signal which reflects said temperature condition, and means for alternately connecting said first and second transformers to the bridge output.

10. Electrical equipment for use on a gas turbine engine for controlling two sets of apparatus as a function of different engine temperatures comprising a first network for one of the sets of apparatus, a second network for the other set of apparatus, said first and second networks embracing a bridge network including a switching device for alternately connecting said bridge output to the first and second networks, a first means in said bridge network for producing a first signal which reflects engine temperature, and second and third means in said bridge network for producing second and third signals respectively which reflect different reference temperature settings, said first and second signals connected differentially to provide a first resultant signal for said first network, said first and third signals connected differentially to provide a second resultant signal for said second network.

11. The combination with a gas turbine engine having two sets of apparatus to be controlled by an operating condition of the engine, of a first network including a first amplifier and a bridge having an output connected to said amplifier for controlling one of the sets of apparatus in accordance with said engine operating condition, a second network including a second amplifier and said bridge with the output thereof connected to said second amplifier for controlling the other set of apparatus, a device connected in the bridge and arranged to sense said engine operating condition and capable of producing a signal which represents said condition, and means in the bridge output for alternately connecting said first and second networks to the bridge output.

12. The combination with a gas turbine engine having a fuel control device and an ignition system, of means for controlling said device according to an engine condition, means for controlling said ignition system according to said engine condition, said first and second mentioned means including an electrical bridge network, a device in said network for supplying a voltage thereto representing said engine condition, and a mechanism for selectively connecting the bridge output to said first and second mentioned means.

13. In combination, a first network for controlling apparatus in accordance with a temperature condition and including a first amplifier and a bridge the output of which is connected to said amplifier, a second network for controlling other apparatus in accordance with said condition and including a second amplifier and said bridge the output of which is connected to said second amplifier, a temperature sensing device in the bridge for establishing a signal therein which reflects said temperature condition, and means in the output of said bridge for periodically connecting said first and second mentioned amplifiers to the bridge output.

References Cited in the file of this patent

UNITED STATES PATENTS

| Number | Name | Date |
| --- | --- | --- |
| 2,317,062 | Jervis | Apr. 20, 1943 |
| 2,391,291 | Bollo et al. | Dec. 18, 1945 |
| 2,542,499 | Fortescue | Feb. 20, 1951 |

FOREIGN PATENTS

| Number | Country | Date |
| --- | --- | --- |
| 625,335 | Great Britain | June 27, 1949 |
| 626,045 | Great Britain | July 8, 1949 |